(12) United States Patent
Parker et al.

(10) Patent No.: US 11,296,373 B2
(45) Date of Patent: Apr. 5, 2022

(54) RECHARGEABLE ZINC/AIR BATTERIES

(71) Applicant: The Government of the United States of America, as represented by the Secretary of the Navy, Arlington, VA (US)

(72) Inventors: Joseph F. Parker, Riva, MD (US); Jeffrey W. Long, Alexandria, VA (US); Debra R. Rolison, Arlington, VA (US); Christopher N. Chervin, Washington, DC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 66 days.

(21) Appl. No.: 16/171,251

(22) Filed: Oct. 25, 2018

(65) Prior Publication Data

US 2019/0173141 A1 Jun. 6, 2019

Related U.S. Application Data

(60) Provisional application No. 62/577,321, filed on Oct. 26, 2017.

(51) Int. Cl.
*H01M 12/08* (2006.01)
*H01M 4/36* (2006.01)
(Continued)

(52) U.S. Cl.
CPC .......... *H01M 12/08* (2013.01); *H01M 4/362* (2013.01); *H01M 4/364* (2013.01); *H01M 4/38* (2013.01);
(Continued)

(58) Field of Classification Search
None
See application file for complete search history.

(56) References Cited

U.S. PATENT DOCUMENTS

| 4,842,963 A | 6/1989 | Ross, Jr. |
| 9,252,616 B2 | 2/2016 | Goldstein |
(Continued)

FOREIGN PATENT DOCUMENTS

| WO | 2015004069 A1 | 1/2015 |
| WO | 2016138594 A1 | 9/2016 |

OTHER PUBLICATIONS

Rolison. "Electrically conductive oxide aerogels: new materials in electrochemistry." pp. 963,971. (Year: 2000).*
(Continued)

*Primary Examiner* — Haroon S. Sheikh
(74) *Attorney, Agent, or Firm* — US Naval Research Laboratory; Joseph T. Grunkemeyer

(57) ABSTRACT

A zinc-air battery having: a cathode, an anode, an electrolyte, a separator between the anode and the cathode, and a housing. The cathode includes: a cathode current collector and a composite having a porous carbon material, a porous cryptomelane-type MnOx material, a porous $Ni_yFe_{1-y}Ox$ material, and a binder. The anode includes: a continuous network having metallic zinc and having metallic zinc bridges connecting metallic zinc particle cores and a continuous network of void space interpenetrating the zinc network. The electrolyte fills the void space in the anode, is in contact with the cathode, and permeates the composite without completely filling or obstructing a majority of the pores. The housing encloses the anode, the cathode, and the separator and exposes the composite to ambient air.

11 Claims, 6 Drawing Sheets

(51) Int. Cl.
H01M 4/62 (2006.01)
H01M 4/38 (2006.01)
H01M 4/90 (2006.01)
H01M 4/86 (2006.01)
H01M 4/02 (2006.01)

(52) U.S. Cl.
CPC ......... *H01M 4/623* (2013.01); *H01M 4/8652* (2013.01); *H01M 4/8668* (2013.01); *H01M 4/9016* (2013.01); *H01M 2004/021* (2013.01); *H01M 2300/0002* (2013.01)

(56) References Cited

U.S. PATENT DOCUMENTS

| | | |
|---|---|---|
| 9,802,254 B2 | 10/2017 | Rolison et al. |
| 10,008,711 B2 | 6/2018 | Rolison et al. |
| 2011/0207001 A1 | 8/2011 | Bert et al. |
| 2017/0331104 A1 | 11/2017 | Parker et al. |
| 2017/0338479 A1 | 11/2017 | Parker et al. |
| 2018/0130998 A1 | 5/2018 | Parker et al. |

OTHER PUBLICATIONS

Chervin et al., "CAD/CAM-designed 3D-printed electroanalytical cell for the evaluation of nanostructured gas-diffusion electrodes" Nanotechnology 27 (2016) 174002.

Chervin et al., "Aerogel Architectures Boost Oxygen-Evolution Performance of NiFe2Ox Spinels to Activity Levels Commensurate with Nickel-Rich Oxides" ChemElectroChem 2016, 3, 1369-1375.

Drillet et al., "Development of a Novel Zinc/Air Fuel Cell with a Zn Foam Anode, a PVA/KOH Membrane and a MnO2/SiOC-based Air Cathode" ECS Transactions, 28 (32) 13-24 (2010).

Ko et al., "Electroanalytical Assessment of the Effect of Ni:Fe Stoichiometry and Architectural Expression on the Bifunctional Activity of Nanoscale NiyFe1-yOx" Langmuir 2017, 33, 9390-9397.

Ko et al., "Electrocatalyzed Oxygen Reduction at Manganese Oxide Nanoarchitectures: From Electroanalytical Characterization to Device-Relevant Performance in Composite Electrodes" J. Electrochem. Soc., 165 (11) H777-H783 (2018).

Ko et al., "Combining battery-like and pseudocapacitive charge storage in 3D MnOx@carbon electrode architectures for zinc-ion cells" Sustainable Energy Fuels, 2018, 2, 626-636.

Li et al., "Advanced zinc-air batteries based on high-performance hybrid electrocatalysts" Nature Communications 4 (2013).

Long et al., "Design of Pore and Matter Architectures in Manganese Oxide Charge-Storage Materials" Electrochem. and Solid-State Lett, 3 (10) 453-456 (2000).

Parker et al., "Rechargeable nickel-3D zinc batteries: An energy-dense, safer alternative to lithium-ion" Science 356, 415-418 (2017).

Parker et al., "Minimizing Shape Change at Zn Sponge Anodes in Rechargeable Ni—Zn Cells: Impact of Electrolyte Formulation" J Electrochem Soc., 163 (3) A351-A355 (2016).

Parker et al., "Wiring zinc in three dimensions re-writes battery performance-dendrite-free cycling" Energy Environ. Sci., 2014, 7, 1117-1124.

Parker et al., "Retaining the 3D Framework of Zinc Sponge Anodes upon Deep Discharge in Zn-Air Cells" ACS Appl. Mater. Interfaces 2014, 6, 19471-19476.

Pettigrew et al., "Nickel ferrite aerogels with monodisperse nanoscale building blocks—The importance of processing temperature and atmosphere" ACS Nano 2008, 2, 784 790.

Zhang, "Novel Anode for High Power Zinc-Air Batteries" ECS Transactions, 3 (42) 1-11 (2008).

* cited by examiner

RECHARGEABLE ZINC/AIR BATTERIES

This application claims the benefit of U.S. Provisional Application No. 62/577,321, filed on Oct. 26, 2017. The provisional application and all other publications and patent documents referred to throughout this nonprovisional application are incorporated herein by reference.

TECHNICAL FIELD

The present disclosure is generally related to zinc-air batteries.

DESCRIPTION OF RELATED ART

The ongoing effort to fulfill the requirements of the ever-growing energy market, including electric vehicles and portable electronic devices, has led to battery technologies that promise to overcome some of the pitfalls of Li-ion batteries. While Li-ion batteries offer substantial benefits, including low self-discharge, no memory effect, and above all, rechargeability, the broader application of Li-ion-based energy storage is limited by safety concerns, manufacturing costs, and lower specific energy densities (<200 W h $kg^{-1}$) relative to other promising battery technologies (Lee et al., Metal-air batteries with high energy density: Li-air versus Zn-air. *Adv. Energy Mater.* 2011, 1, 34-50). One such battery alternative, zinc-air, has high practical specific energy densities (>400 W h $kg^{-1}$) and the advantage of a cheap and environmentally friendly active material (zinc) coupled to cathodes that consume molecular oxygen supplied directly from ambient air (Neburchilov et al., A review on air cathodes for zinc-air fuel cells. *J. Power Sources* 2010, 195, 1271-1291). While successful as a primary (single use) battery in certain commercial applications (e.g., the hearing-aid market), further application utility of zinc-air is hindered by its historic lack of rechargeability, minimal pulse power, and by the fact that <60% of the theoretical discharge capacity of the Zn anode is typically tapped. These limitations are inherent to the electrochemical behavior in aqueous alkaline electrolyte of zinc in the traditional powder-composite anode form-factors that are used in commercial zinc-air batteries.

A major obstacle to realizing rechargeable Zn-air batteries is the short circuit-inducing dendrites that form at the Zn anode during extended charge-discharge cycling. When discharging zinc-air batteries that contain a standard powder-composite negative electrode, which comprises zinc powder mixed with gelling agents, electrolyte, and/or binders, the metallic zinc oxidizes and immediately forms soluble zincate ions with the hydroxide ions of the electrolyte. The now-soluble zinc in the form of a zincate ion diffuses from its point of electrogeneration until it reaches supersaturation conditions, and rapidly dehydrates and precipitates to form insulating zinc oxide (ZnO) (Cai et al., Spectroelectrochemical studies on dissolution and passivation of zinc electrodes in alkaline solutions. *J. Electrochem. Soc.* 1996, 143, 2125-2131). Upon electrochemical recharge, the resultant zinc oxide is reduced back to zinc metal, albeit at a location (i.e., zinc surface) and shape that differs from its original state. With increasing discharge-(re)charge cycle number, this shape change becomes more pronounced, eventually causing dendrites to sprout from the regions of high current density (i.e., electric field) at the negative electrode until the dendrites grow to lengths that pierce the separator and short-circuit battery operation.

This localized, anomalous dendrite-forming problem has been solved by fabricating the Zn anode as a pore-solid architecture in which the 3D-interconnected pore volume is co-continuous with the 3D-interconnected solid zinc network, i.e., a "sponge" form factor (Parker et al., Wiring zinc in three dimensions re-writes battery performance-dendrite-free cycling. *Energy Environ. Sci.* 2014, 7, 1117-1124; U.S. Pat. Nos. 9,802,254; 10,008,711). The metallic, conductive pathways in 3D improve current distribution throughout the electrode structure and avoid uneven reaction loci where formation of dendrites is likely to occur during charge-discharge cycles (Cai; Arora et al., Battery separators. *Chem. Rev.* 2004, 104, 4419-4462). In addition, the pore network intertwined around the 3D zinc scaffold allows for confined volume elements with a high surface (zinc) to volume (electrolyte) ratio; confinement induces saturation of zincate at lower concentrations than occurs in open solution, thus dehydration to ZnO occurs earlier in the discharge process, thereby further minimizing shape change.

A second major deficiency in the art of rechargeable Zn-air batteries is the lack of stable and efficient catalysts for the air-breathing positive electrode-agents that facilitate both the oxygen reduction reaction (ORR) for the discharge process and the oxygen evolution reaction (OER) required for the recharge process. Of these two reactions, OER catalyst design presents a greater challenge because the reaction kinetics are less favorable and they occur within the air cathode under conditions of high positive voltage that are highly oxidizing and corrosive. In the aqueous alkaline conditions of a Zn-air battery, nickel-iron oxides ($Ni_aFe_bOx$), layered double hydroxides, and oxyhydroxides ($Ni_aFe_bOOH$) —including $Ni_{1-y}Fe_y$ metallic films that form oxyhydroxy speciation in situ—are reported to be among the most active transition-metal OER catalysts (McCrory et al., Benchmarking heterogeneous electrocatalysts for the oxygen evolution reaction. *J. Am. Chem. Soc.* 2013, 135, 16977-16987).

BRIEF SUMMARY

Disclosed herein is a zinc-air battery comprising: a cathode, an anode, an electrolyte, a separator between the anode and the cathode, and a housing. The cathode comprises: a cathode current collector and a composite comprising a porous carbon material, a porous cryptomelane-type MnOx material, a porous $Ni_yFe_{1-y}Ox$ material, and a binder. The anode comprises: a continuous network comprising metallic zinc and having metallic zinc bridges connecting metallic zinc particle cores and a continuous network of void space interpenetrating the zinc network. The electrolyte fills the void space in the anode, is in contact with the cathode, and permeates the composite without completely filling or obstructing a majority of the pores. The housing encloses the anode, the anode (negative) current collector, the cathode, the cathode (positive) current collector, and the separator and exposes the composite to ambient air.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1A:
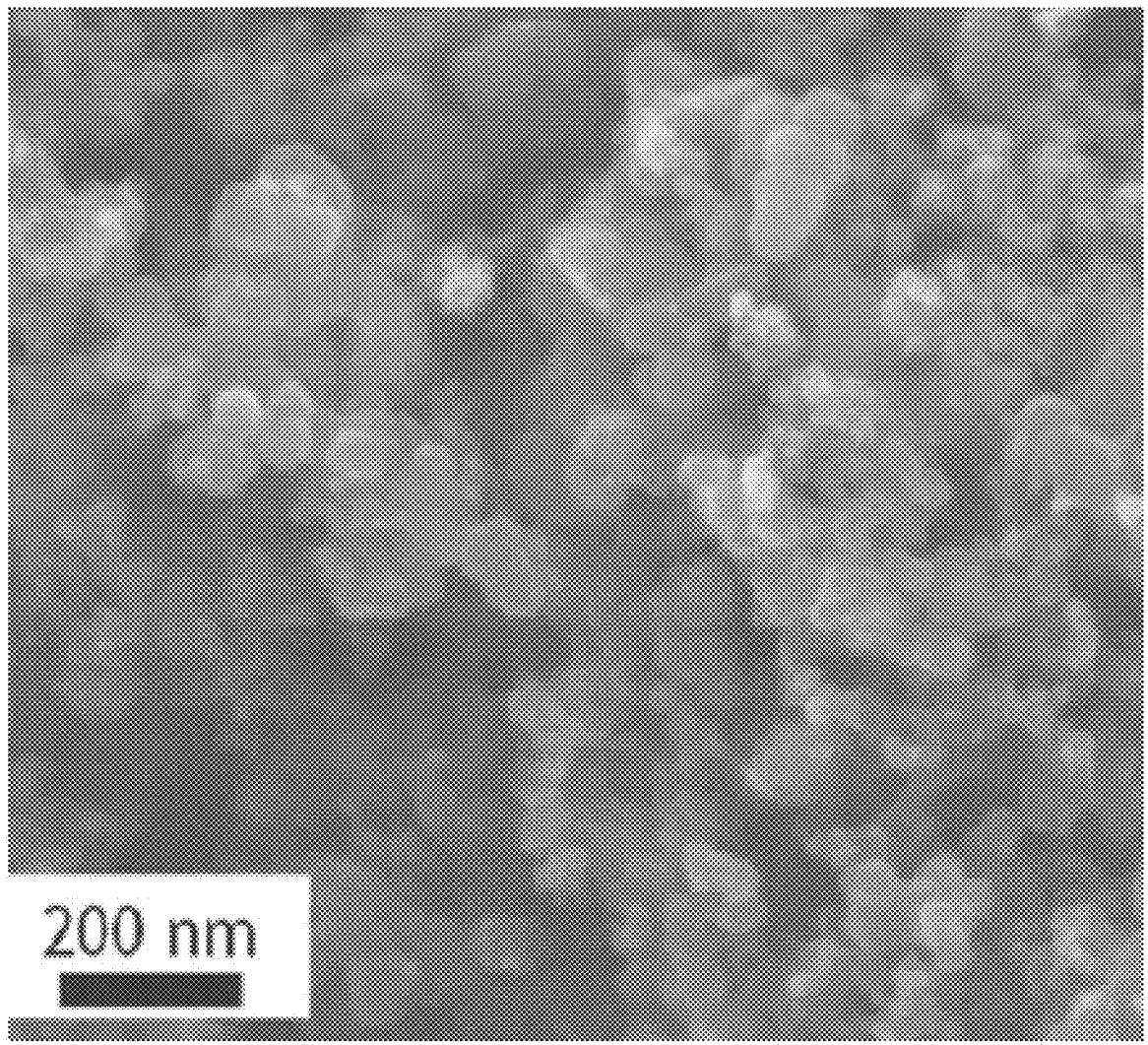
FIGS. 1A-B show scanning electron micrographs of $MnOx/Ni_{0.33}Fe_{0.67}Ox$/Vulcan carbon bifunctional cathode (1A) and catalyst-free Vulcan carbon composite cathode (1B) (Chervin et al., CAD/CAM-designed, 3D-printed electroanalytical cell to evaluate air-breathing nanostructured electrodes. *Nanotechnology* 2016, 27, 174002).
Figure 1B:
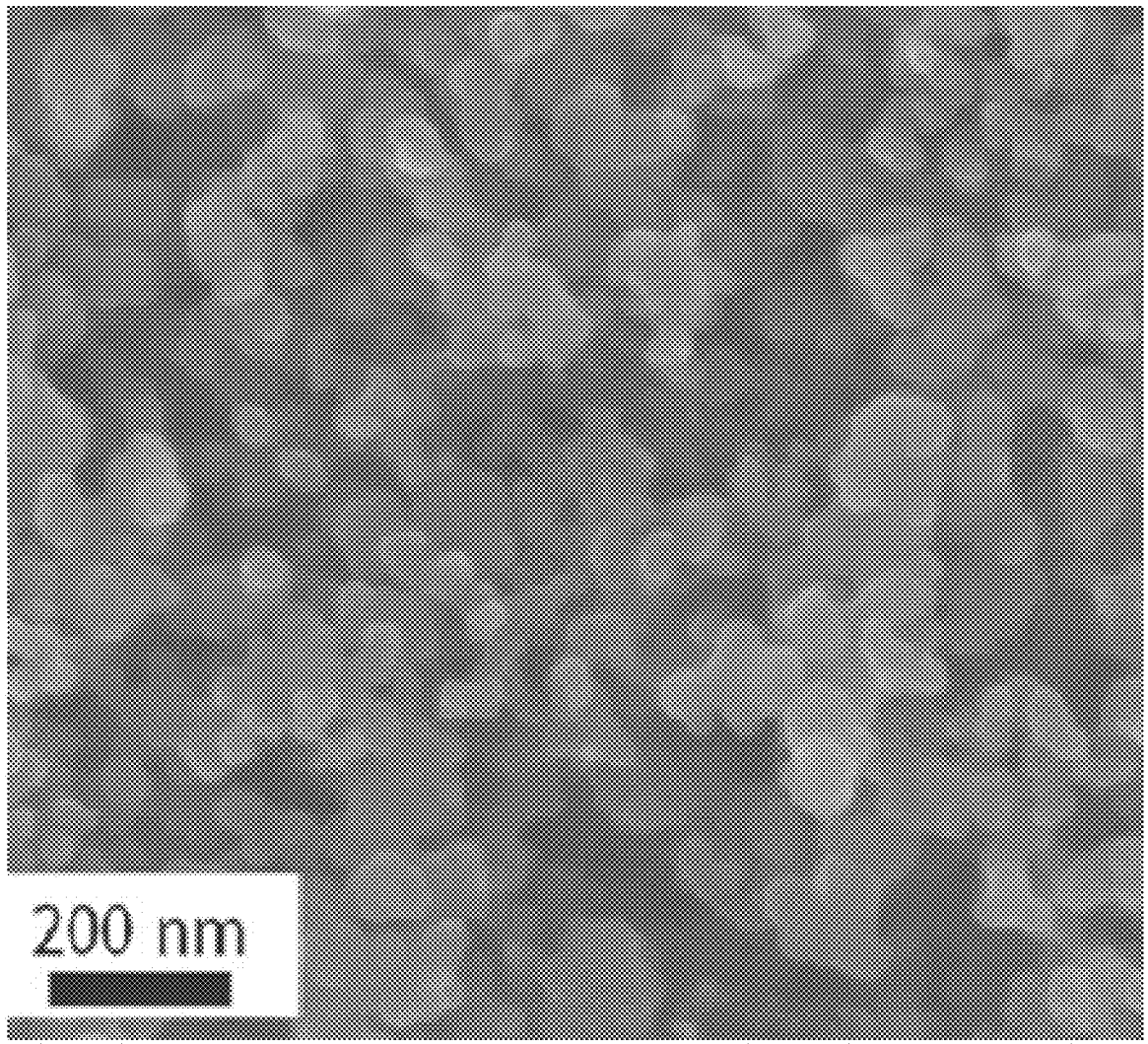

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

It is demonstrated that synthesizing $Ni_{0.33}Fe_{0.67}$Ox ($NiFe_2Ox$), for example, as a nanocrystalline aerogel (a nanostructured pore-solid architecture) substantively improves electrocatalytic performance at typical rates used in a Zn-air battery, approaching OER activity comparable to Ni-rich ferrites (Chervin, et al., Aerogel architectures boost oxygen-evolution performance of $NiFe_2Ox$ spinels to activities commensurate with nickel-rich oxides. *ChemElectroChem* 2016, 3, 369-1375). Variations of this synthetic method are used to prepare atomically disordered to nanocrystalline $Ni_yFe_{1-y}$Ox aerogels that are then incorporated into carbon-based electrode structures. The oxygen-reduction catalytic function is imparted to these cathodes by adding, for example, cryptomelane-type MnOx (a well-known ORR catalyst in the art) (U.S. Pat. Nos. 5,308,711; 5,378,562; PCT Pat. Appl. Pub. WO2007056775) that is synthesized as ORR-catalytic xerogels or aerogels via sol-gel methods (Ko, et al., Electrocatalyzed oxygen reduction at manganese oxide nanoarchitectures: From electroanalytical characterization to device-relevant performance in composite electrodes. *J. Electrochem. Soc.* 2018, 165, H777-H783) —or the $Ni_yFe_{1-y}$Ox nanoarchitecture is used as a bifunctional catalyst to provide both OER and ORR activity within the air cathode.

Disclosed herein is a rechargeable zinc-air cell or battery that features a monolithic zinc (Zn) anode with co-continuous, interpenetrating networks of void and solid zinc versus a carbon-based, air-breathing cathode functionalized with transition metal oxide catalyst or catalysts. Interconnected Zn anodes are prepared as "sponges," which can be fabricated by forming an emulsion of zinc powder in a two-phase mixture in the presence of emulsion stabilizers to produce highly viscous, yet pourable mixtures that are dried in molds and subsequently heated to yield robust monolithic electrodes (Parker et al., Wiring zinc in three dimensions re-writes battery performance-dendrite-free cycling. *Energy Environ. Sci.* 2014, 7, 1117-1124). The metal oxide catalysts incorporated within the cathode can include oxides of manganese and/or solid-solution or mixed-phase oxides of transition metals such as nickel and/or iron prepared via sol-gel synthetic methods followed by ambient-condition drying to form xerogels or "ambigels" or drying by supercritical fluid extraction to form ultraporous aerogels. Rechargeable coin-type cells are assembled and cycled to 30% depth of discharge of the theoretical capacity of the Zn anode (designated herein as $DOD_{Zn}$), such that the full rechargeability of the cell is demonstrated because the multiple cycles at this $DOD_{Zn}$ would exhaust the total amount of zinc present multiple times over unless recharging of the discharge-depleted zinc occurs. The Zn sponge electrode, with a persistent core of 3D interconnected zinc metal ("wiring"), facilitates high conductivity throughout discharge and recharge steps thereby allowing higher utilization of the zinc in a rechargeable application such as described herein. The 3D wiring improves current distribution throughout the volume of the Zn electrode, thereby improving electrochemical reactivity and inhibiting the formation of anomalous dendrites that lead to electrical shorting of the cell, a known problem in conventional Zn-air and other Zn-based alkaline batteries.

Full recharge is demonstrated over many discharge-charge cycles of a Zn-air coin cell that comprises a Zn sponge anode versus a carbon-based cathode in which are incorporated $Ni_yFe_{1-y}$Ox nanoarchitectured oxides that catalyze $O_2$-evolution during charge and MnOx nanoarchitectured oxides that catalyze $O_2$-reduction during discharge.

The development of zinc-air batteries capable of rechargeability at deep levels of Zn utilization with capacity recovery requires: (i) redesign of the architecture of the zinc electrode to provide high surface-area electrochemical interfaces with improved current distribution to thereby suppress the overgrowth of electrodeposited Zn and deleterious dendrite formation; and (ii) development of a cathode functionalized with efficient and stable $O_2$-evolution and $O_2$-reduction catalysts. Zinc-air batteries based on traditional powder-bed zinc composites suffer from low utilization of the theoretical specific capacity of the zinc (<60%), high content of electrolyte additives, nonuniform current distribution, and limited rechargeability. The cells disclosed herein describe the preparation of a rechargeable Zn-air battery using a new monolithic zinc anode that markedly improves on these drawbacks. The disclosed results also demonstrate the ability to use powder-composite formulations to define an air cathode in which high surface-area nanoarchitectured catalysts provide oxygen-reduction and -evolution performance that can match the rate and energy capabilities of the rechargeable zinc sponge anode.

The battery includes a cathode current collector, a cathode comprising a composite material, an anode current collector, an anode, an electrolyte, a separator, and a housing. Any configuration may be used that allows electrical contact such that the device acts a battery. For example, the cathode current collector and the composite cathode may both be planar, with the composite exposed to the air or to a source gas. In order to allow both air and the electrolyte to contact the composite, the battery may be configured with perforations in the cathode current collector or housing to allow the passage of either air or electrolyte through the hole and to the composite cathode. The composite cathode may at times be placed on both sides of the monolithic zinc anode within the housing. The composite may at times be sealed from contact with gases, but any such seal would be removable. The composite may be exposed to, for example, ambient air or a source of gaseous oxygen, such as a tank of oxygen or any combination of oxygen mixed with additional unreactive gases (e.g., nitrogen, argon, helium).

The porous carbon structure contains pores that are generally interconnected to allow a gas to permeate through the structure. The portions of the structure that line the pores are referred to as the surface. Suitable carbon structures include, but are not limited to, a carbon black, graphitic or graphene-like carbon, a carbon aerogel, a carbon nanofoam, a carbon xerogel, a templated mesoporous carbon, a templated macroporous carbon, and a carbon nanotube/nanofiber assembly. Suitable pore diameters may include, but are not limited to, about 2 nm to about 1 µm.

The composite in the cathode includes porous cryptomelane-type MnOx and porous $Ni_yFe_{1-y}Ox$. The porous forms may be, for example, aerogels, ambigels, or xerogels. These materials may be made as described below or as in Chervin et al., "CAD/CAM-designed 3D-printed electroanalytical cell for the evaluation of nanostructured gas-diffusion electrodes" Nanotechnology 27 (2016) 174002. Suitable $Ni_yFe_{1-y}Ox$ compounds include, but are not limited to, $Ni_{0.33}Fe_{0.67}Ox$ and $Ni_{0.75}Fe_{0.25}Ox$. The composite also includes a binder, which may be, for example, poly(tetrafluoroethylene).

The zinc anode may be made as described below or as in U.S. Pat. Nos. 9,802,254; 10,008,711; US Pat. Appl. Pub. 2018/0130998; or Parker et al., "Rechargeable nickel-3D zinc batteries: An energy-dense, safer alternative to lithium-ion" Science 356, 415-418 (2017).

The electrolyte fills the pores of the anode and permeates the composite of the cathode, but it does not fill or obstruct a majority of the pores of the cathode. This structure allows ingressing air to contact the catalytic sites of the cathode. Both aqueous, nonaqueous, and ionic liquid electrolytes may be used including, but not limited to, aqueous potassium hydroxide (KOH), aqueous alkaline hydroxide, aqueous electrolyte or polymer having a pH≥7, ionic liquid or gel, and a nonaqueous liquid or gel of sufficient dielectric constant to dissociate salts soluble in the liquid or gel.

The separator may be any physical barrier that allows passage of hydroxide ions between the anode and the cathode. The separator may be an electrolyte-compatible material such as a porous polymer membrane. As used herein "a separator" can refer to one or more than one separator within a single battery.

A circuit may be formed by electrically connecting an electrical load to the anode current collector and the cathode current collector. The battery can then supply a current to the load when the composite is exposed to an oxygen-containing gas, which may be, for example, ambient air or pure oxygen. This occurs by reduction of the oxygen in the porous cathode and oxidation of the zinc in the porous anode. At any point, an appropriate current may be applied to the anode and cathode to recharge the battery.

Synthesis of metal-oxide catalysts and preparation of carbon-based cathodes—The gas-diffusion cathode structure in a rechargeable Zn-air battery must contain catalysts that enable the oxygen reduction reaction (ORR) for battery discharge as well as the oxygen evolution reaction (OER) for the reverse reaction upon recharge. The cell demonstrated in the example herein comprises carbon-based composite cathodes that are functionalized with $Ni_yFe_{1-y}Ox$ aerogels and cryptomelane-type MnOx xerogels that support $O_2$-evolution and $O_2$-reduction electrocatalysis, respectively. The cathodes are prepared by ball-milling an aqueous slurry of the conductive carbon component, pre-formed and heat-treated powders of the catalysts, and PTFE binder followed by drying and then pressing into monolithic structures.

Cryptomelane-type MnOx xerogel was prepared using sol-gel synthesis (Long et al., Design of pore and matter architectures in manganese oxide charge-storage materials. Electrochem. Solid-State Lett. 2000, 3, 453-456). As an example, 750 mg of $KMnO_4$ (97%, Sigma-Aldrich) was dissolved in 25 mL of water to which 193 mg of solid fumaric acid (Fluka) was added. The beaker was placed in a desiccator and stirred at 600 rpm under vacuum for 10 min with the valve periodically closed to prevent boil over from the vigorous out-gassing that accompanies the reaction. After 10 min the out-gassing slowed and the solution was stirred under full vacuum for an additional 10 min. The solution was removed from vacuum, covered with PARAFILM®, and allowed to gel overnight. The resulting wet gel was rinsed periodically over several days with copious amounts of water and rinsed once with 1 M $H_2SO_4$ followed by several more water and then acetone rinses. The acetone was poured off and the gel dried at 50° C. under flowing $N_2$ for ~12 h. The resulting MnOx xerogel was ground to a fine powder using a mortar and pestle and heated to 300° C. in static air.

Sol-gel-derived $Ni_yFe_{1-y}Ox$ aerogels are prepared using an epoxide-initiated sol-gel process, similar to previously published protocols (Long et al., Nanocrystalline iron oxide aerogels as mesoporous magnetic architectures. J. Am. Chem. Soc. 2004, 126, 16879-16889; Pettigrew et al., Nickel ferrite aerogels with monodisperse nanoscale building blocks—The importance of processing temperature and atmosphere. ACS Nano 2008, 2, 784-790; Chervin, et al., Aerogel architectures boost oxygen-evolution performance of $NiFe_2Ox$ to activities commensurate with nickel-rich oxides. ChemElectroChem 2016, 3, 1369-1375). Briefly, nickel(II) chloride hexahydrate ($NiCl_2.6H_2O$; 99.95%, Sigma-Aldrich) and iron(III) chloride hexahydrate ($FeCl_3.6H_2O$; 97%, Sigma-Aldrich) were dissolved in ethanol in the desired atomic ratio of Ni to Fe and then epichlorohydrin (99%, Fluka) was added to induce gelation; the molar ratios of ethanol and epichlorohydrin to total moles of metal ions in solution was 86:1 and 30:1, respectively. A dark-red, monolithic gel formed within 1 h, was covered, and then aged overnight in the mother liquor. The gels were rinsed with ethanol and solvent-exchanged with copious amounts of acetone over the course of 1 week. The acetone-rinsed $NiFe_2Ox$ gels were solvent-exchanged with liquid $CO_2$ in an autoclave and then heated to ~45° C. while the internal pressure increased to ~8.2 MPa, bringing $CO_2$ past its critical point ($T_c$ 31° C.; $P_c$ 7.4 MPa); the $CO_2$ was then slowly drained from the autoclave to yield a dried aerogel. The $NiFe_2Ox$ aerogel was ground to a fine powder using a mortar and pestle and heated in a tube furnace under flowing Ar (~50 $cm^3$ $min^{-1}$) to 300° C. at a heating and cooling rate of 2° C. $min^{-1}$ with a 4-h dwell time at 300° C.

In an alternate protocol, amorphous gels of $Ni_yFe_{1-y}Ox$ are synthesized by stirring the respective stoichiometric amounts of $NiCl_2.6H_2O$ and $FeCl_3.6H_2O$ in 53 mL of ethanol for 15 min and subsequently adding 22 mL of propylene oxide ($C_3H_6O$, Sigma-Aldrich, REAGENTPLUS®≥99%). The mixture is then stirred for 20 min, covered, and left to sit unstirred overnight to complete gelation. In order to prepare ambigel nanoarchitectures (wet gels dried at ambient pressure), the $Ni_yFe_{1-y}Ox$ gels are thoroughly washed with hexanes for three days before drying under a flowing $N_2$ atmosphere at 50° C. To process into aerogels, the $Ni_yFe_{1-y}Ox$ gels are washed with copious amounts of acetone for 6 d before supercritically drying with liquid $CO_2$. The ambigels and aerogels are heated at a ramp rate of 2° C. $min^{-1}$ under an atmosphere of either high or low oxygen partial pressure to a hold temperature typically ≥250° C.

Bifunctional gas-diffusion electrodes containing nanoarchitectured ORR/OER catalysts (Chervin et al., CAD/CAM-designed, 3D-printed electroanalytical cell to evaluate air-breathing nanostructured electrodes. *Nanotechnology* 2016, 27, 174002) were fabricated with sol-gel-derived cryptomelane-type MnOx xerogel (for $O_2$ reduction), spinel $Ni_yFe_{1-y}Ox$ aerogel (for $O_2$ evolution), XC-72 Vulcan carbon (Cabot) or acetylene black carbon conductive component, and PTFE binder (60 wt % dispersion in $H_2O$; Aldrich) in, for example, a 10/10/65/15 or 20/20/45/15 weight ratio of $MnOx/Ni_yFe_{1-y}Ox$/conductive carbon/PTFE. To prepare the composite, dried active materials and carbon were combined with a PTFE aqueous dispersion and 20 mL of water in a stainless-steel ball mill with stainless-steel milling media. The mixture was milled for 120 min in a Fritsch Pulverisette 7 mill at 300 rpm in six 20-min intervals with a 5-min rest between each interval. The resulting mixture was dried under flowing $N_2$ at ~70° C. overnight to produce a tacky composite powder. The dried composite mixture was weighed into two 40-mg portions and a nickel mesh was sandwiched between the two portions in a 1-cm² die. The composites were pressed at 3000 psi for 1 min to form a ~0.8 mm-thick, circular gas-diffusion electrode.

The homogenous composite cathode, once dried and pressed, forms a nanostructured gas-diffusion electrode with an ad-hoc network of pores spanning 100-200 nm (FIG. 1A). Vulcan carbon, the main constituent of the electrode, forms a structural backbone and provides electronic conductivity. The MnOx and $Ni_yFe_{1-y}Ox$ electrocatalysts comprise 20-40 wt % of the composite cathode and are dispersed homogeneously over the surfaces of the carbon thereby providing electrocatalytic sites at the interface between electrolyte-wetted electrode surfaces and the $O_2$-distributing porous network.

Preparation of monolithic zinc sponges—A typical preparation of zinc sponge electrodes begins with the formation of an emulsion of zinc powder in water and decane. To a small beaker or scintillation vial, was added 25 g of zinc powder that may be pre-formed to contain 300-ppm of indium and 300-ppm of bismuth (e.g., Grillo-Werke AG). The indium and bismuth constituents are additive examples necessary to move the overpotential for hydrogen evolution in alkaline electrolytes to more negative values, while eliminating the need for toxic additives such as lead and mercury (U.S. Pat. No. 5,240,793). Water (4.28 mL) and decane (9.51 mL) were added along with an emulsifier, sodium dodecyl sulfate (26.3 mg), and emulsion stabilizer, carboxymethylcellulose (1.05 g). The use of these ingredients in the formation of zinc emulsions (Drillet et al., Development of a novel zinc/air fuel cell with a Zn foam anode, a PVA/KOH membrane, and a $MnO_2$/SiOC-based air cathode. *ECS Trans.* 2010, 28, 13-24), which are subsequently used to make rugged, monolithic zinc sponge electrodes, has been described previously (Parker et al., Wiring zinc in three dimensions re-writes battery performance-dendrite-free cycling. *Energy Environ. Sci.* 2014, 7, 1117-1124). The mixture was stirred at 1,200 rpm for >15 min to insure complete uptake of zinc into the emulsion. The freely flowing, yet viscous emulsion was poured into cylindrical, polyethylene molds and allowed to air-dry overnight. The molds used in this example are 1.15-cm in diameter and can yield disk-shaped zinc sponges from 1-4 mm thick; however, this procedure is scalable to other sizes and shapes. After 16-24 h of drying, the mold was inverted to release the zinc monoliths, which are fragile at this stage.

To strengthen the zinc sponges, samples were transferred to a tube furnace and heated under flowing argon at a positive ramp rate of 2° C. $min^{-1}$ to an annealing temperature of, for example, 410° C. (m.p. Zn: 420° C.) and held at temperature for 2 h. The argon flow was then removed and the tube was opened to ambient air and heated for a second step at 2° C. $min^{-1}$ to 665° C. and held for 2 h. This final step created a shell of thermally grown zinc oxide (ZnO) at the surface of the Ar-melded particles, which constrains the pore-solid architectural form of the metal sponge as the annealed zinc particles fuse into a network—this step is necessary to impart additional strength to the zinc sponges. After 2 h the tube is allowed to cool to ambient without any rate control.

The intentional introduction of an oxide shell at the inner and outer surfaces of the zinc sponge enhances its mechanical integrity, allowing the monolithic sponges to be routinely handled with decreased risk of fracture. However, this layer of oxide on the zinc network lowers the initial capacity of a 3D Zn-containing energy-storage cell upon initial discharge and introduces charge-transfer resistance and contact resistance at the junction of the current collector of the cell with the ZnO-terminating surface of the sponge when assembling the zinc-containing cell. In order to reduce ZnO to Zn metal in the sponge, as-heat-treated sponges were sandwiched in an envelope of tin-coated copper mesh to form a working electrode that is balanced versus a counter electrode (e.g., Pt) and a Zn wire quasi-reference electrode. (Tin contacts are used because tin is galvanically compatible with zinc and corrosion of the electrode is suppressed that would otherwise be rampant with other current collectors (e.g., nickel, etc.).) Electrochemical reduction of the oxide-coated sponge to all metallic zinc was achieved by applying a constant potential of −50 mV vs. Zn for 30 min, followed by electrochemical impedance and open-circuit potential (OCP) measurements. This sequence was repeated until the OCP stabilized at or near 0 mV, indicating complete reduction of the thermal oxide shell to zinc metal (Parker et al., Wiring zinc in three dimensions re-writes battery performance-dendrite-free cycling. *Energy Environ. Sci.* 2014, 7, 1117-1124). The reduction step successfully lowers the amount of zinc oxide present on the sponge, which would otherwise limit initial capacity and increase resistance when incorporated into a zinc-containing battery.

Figure 2:
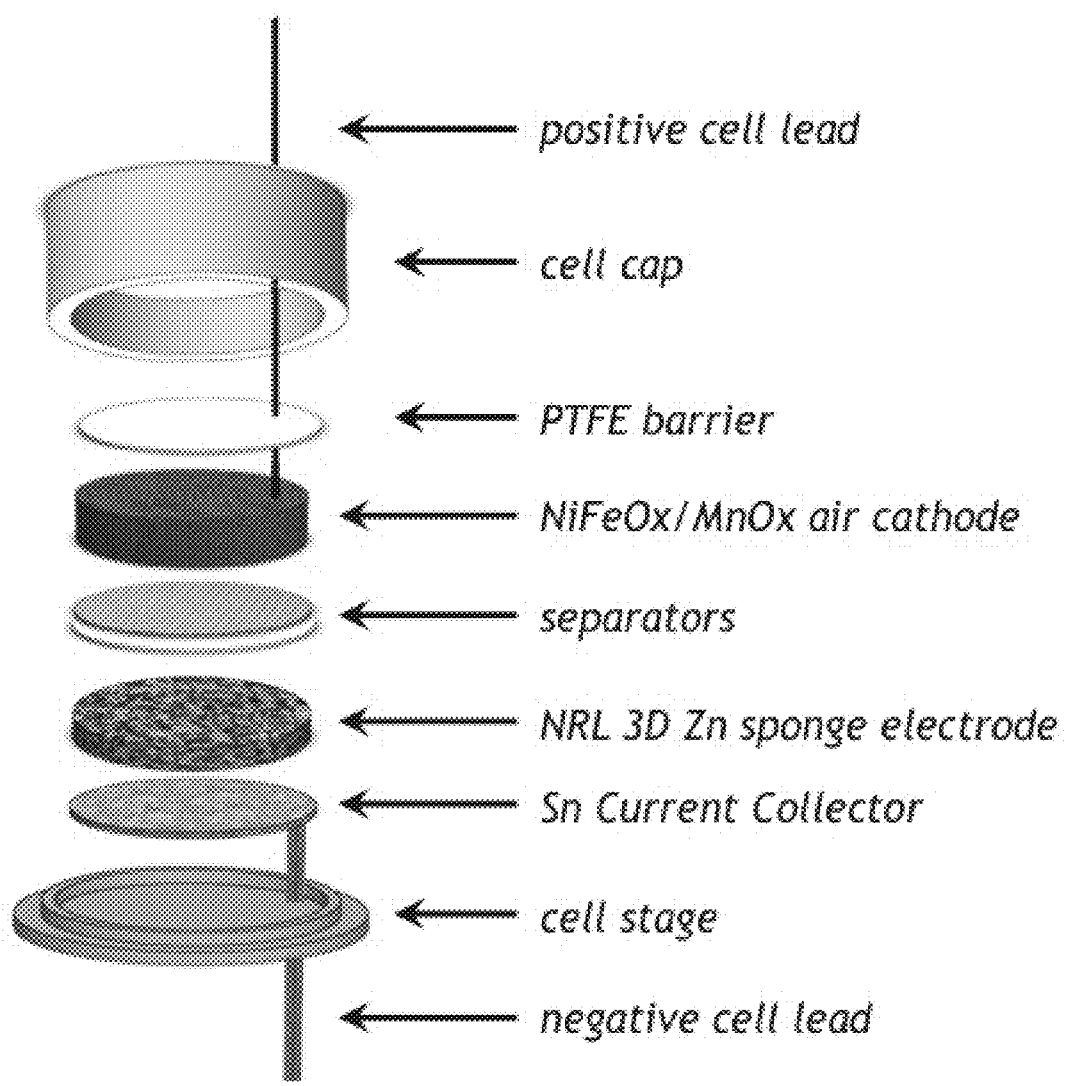
FIG. 2 shows an exploded view of the components in the rechargeable zinc-air coin cell; the cell cap includes an opening to allow air ingress and $O_2$ outgas.

Assembly of rechargeable zinc-air batteries—Once the zinc oxide shell on the zinc sponge is reduced to $Zn^0$ using the method described above, it is ready to be used as a negative electrode in a full-cell battery. The housing used for discharge-charge cycling of the prototype zinc-air cell was based on a 0.635-cm radius nylon screw cover (Hillman Group), which snaps together to enclose the cell components while providing a 6-mm hole on the top face, which serves as the air-breathing side of the cell (FIG. 2). The air hole is covered with TEFZEL® or a microporous separator (e.g., Celgard 3401 or Celgard 3501) to allow air ingress and $O_2$ outgas while minimizing either evaporation or imbibition of water vapor into and out of the cell thereby preventing the electrolyte from respectively drying out or flooding. On the negative electrode side (zinc sponge anode), tin was used as the current collector and negative terminal. The dried Zn sponge was weighed and then infiltrated with electrolyte (6-12 M KOH) for ~1 h under vacuum. Excess electrolyte was removed from the zinc sponge by dabbing with a KIMWIPE™ or sweeping across a dry glass microscope slide, leaving only the inner and outer surfaces of the zinc sponge coated with electrolyte. The electrolyte-wetted zinc sponge was placed on the tin current collector, followed by the separator(s) (for example, microporous Celgard 3501 topped with nonwoven Freudenberg 78/28K), both of which have dimensions slightly larger than the diameter of the zinc sponge (in this example, ~1.15 cm). A carbon-based cathode, as described above was then placed on top of the separators to serve as the positive electrode. Nickel mesh was placed on top of the air-cathode, followed by platinum or nickel wire, which serves as the positive electrode terminal during cell evaluation.

Figure 3:
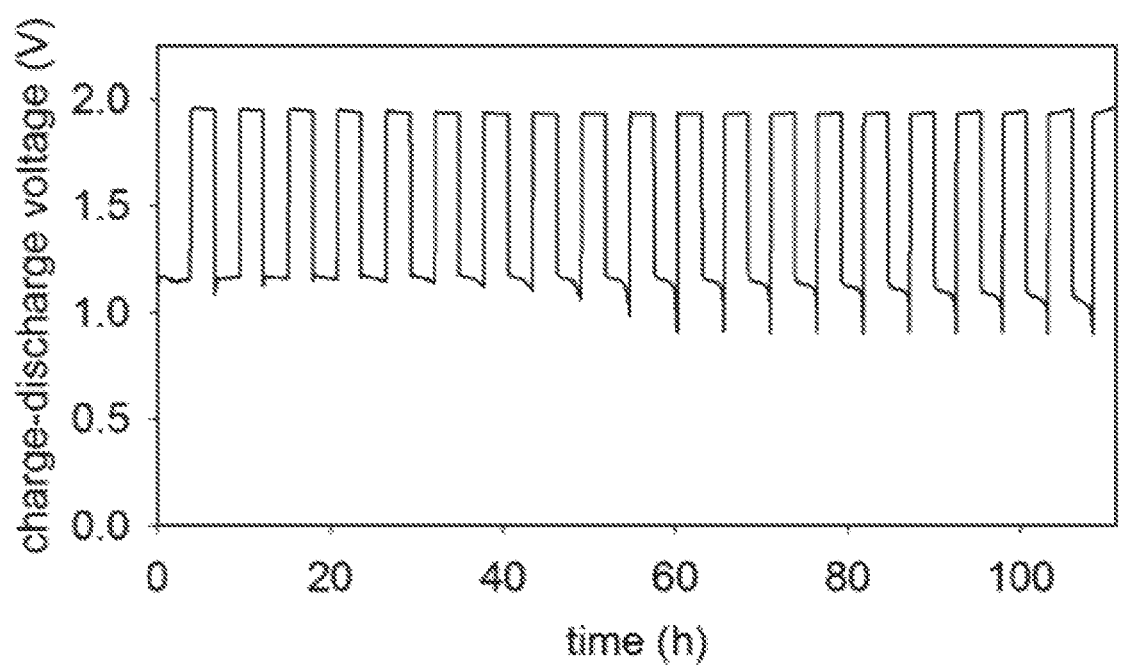
FIG. 3 shows charge-discharge cycling of 3D zinc-air coin cell to 30% $DOD_{Zn}$: 12 M KOH; air cathode: MnOx/$Ni_{0.33}Fe_{0.67}$Ox/conductive carbon/PTFE.

Demonstration of rechargeable zinc-air cells—The discharge-charge performance for a typical zinc-air battery utilizing an electroreduced zinc sponge anode and the $Ni_yFe_{1-y}Ox$ aerogel-catalyzed cathode are shown in FIG. 3. In this example, the bifunctional gas-diffusion cathode was fabricated with a 10/10/65/15 weight ratio of $MnOx/Ni_{0.33}Fe_{0.67}Ox$/conductive carbon/PTFE and 12 M KOH was used as the electrolyte. The open-circuit voltage (OCV) of the as-fabricated cell was 1.4 V prior to discharging the battery at 10.0 mA $cm^{-2}$, with a first-cycle steady-state discharge voltage of 1.2 V and a cutoff voltage of 0.9 V. The initial discharge was set to 37.7 mAh (40% $DOD_{Zn}$) and all subsequent charge-discharge steps were limited to a nominal capacity of 28.3 mAh (30% $DOD_{Zn}$) The first cycle was discharged 9.4 mAh more than the subsequent cycles in order to impart a buffering amount of potassium zincate into the electrolyte solution and to prevent overcharge during the constant-current 10.0 mA $cm^{-2}$ charge steps. For this example, the cell achieved 20 charge-discharge cycles before falling below 80% of the nominal capacity, or a total of 545 mAh, or nearly 6× the total theoretical capacity (i.e., full oxidative utilization) of the Zn electrode, demonstrating successful recharging of both electrodes.

Figure 4:
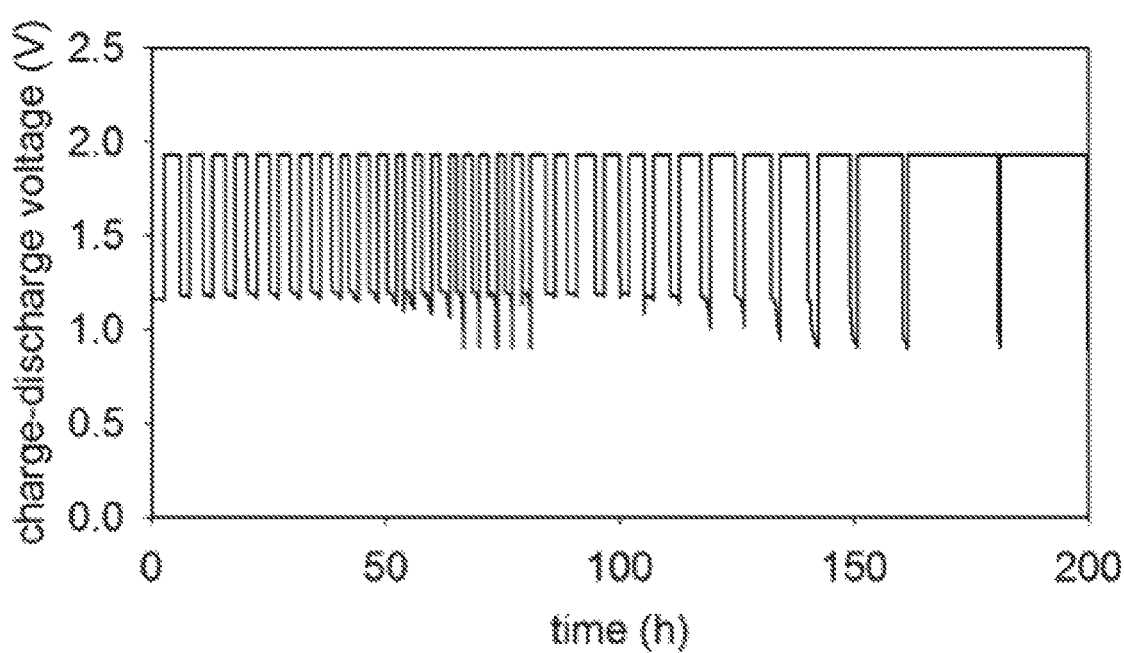
FIG. 4 shows charge-discharge cycling of 3D zinc-air coin cell to 30% $DOD_{Zn}$: 9 M KOH; air cathode: MnOx/$Ni_{0.75}Fe_{0.25}$Ox/conductive carbon/PTFE.

Other cathode compositions, including variations of the $Ni_yFe_{1-y}Ox$ stoichiometry as well as variations of the transition metal oxide composition and electrolyte concentrations are logical extensions of the above demonstration. FIG. 4 shows the discharge-charge behavior of a cell prepared with $Ni_{0.75}Fe_{0.25}Ox$ aerogel as the OER catalyst and within the air cathode, a 20/20/45/15 weight ratio of $MnOx/Ni_{0.75}Fe_{0.25}Ox$/conductive carbon/PTFE. Here, as a separate demonstration, acetylene black was used as the conductive carbon component and an electrolyte concentration of 9 M KOH. The as-fabricated cell had an OCV of 1.49 V prior to discharging the battery at 12.3 mA $cm^{-2}$, with a first-cycle steady-state discharge voltage of 1.2 V and a cutoff voltage set to 0.9 V. The initial discharge was set to 33.8 mAh (40% $DOD_{Zn}$) and all subsequent discharge steps were limited to a nominal capacity of 25.4 mAh (30% $DOD_{Zn}$) The first cycle was discharged 8.4 mAh more than the subsequent cycles in order to impart a buffering amount of potassium zincate into the electrolyte. To demonstrate reliability in cell performance under differing conditions, the charging profile for this example was a constant-voltage charge at 1.93 V rather than the constant-current charging of the previous example. The constant-voltage charge was limited to 25.4 mAh and eventually increased to 38.1 mAh towards the end of the cycling lifetime to ensure complete recharge. For this example, the cell achieved 31 charge-discharge cycles before falling below 80% of the nominal capacity, or a total of 742 mAh, or nearly 9× the total theoretical capacity of the Zn electrode, demonstrating successful recharging of both electrodes.

Figure 5:
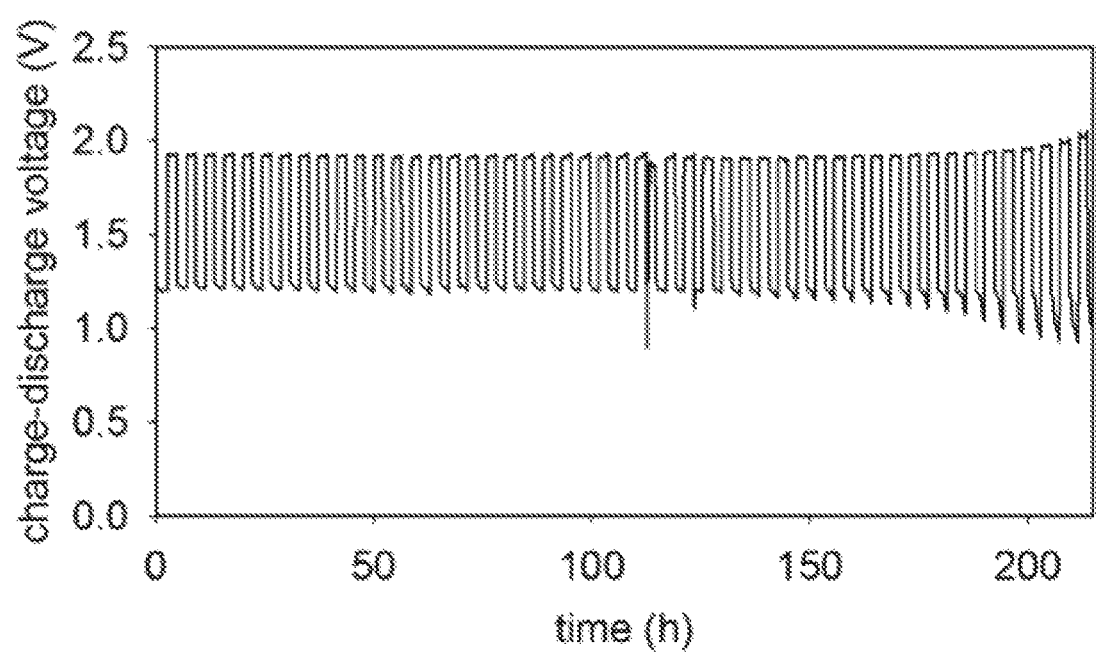
FIG. 5 shows charge-discharge cycling of 3D zinc-air coin cell to 15% $DOD_{Zn}$: 9 M KOH; air cathode: MnOx/$Ni_{0.75}Fe_{0.25}$Ox/conductive carbon/PTFE.

To further demonstrate a technologically relevant rechargeable Zn-air cell in which the total amount of Zn present in the cell must participate multiple times over the course of the cycling lifetime of the cell, rather than serving as an oversized reservoir of Zn, a cell was poised to cycle at lower rate and lower depth of discharge but over more cycles (FIG. 5). Here a cell configuration with a 20/20/45/15 weight ratio of $MnOx/Ni_{0.75}Fe_{0.25}Ox$/conductive carbon/PTFE in 9 M KOH was run at 5 mA $cm^{-2}$ set to consume an average of 15% $DOD_{Zn}$. The OCV of the as-fabricated cell was 1.45 V prior to discharging the battery, with a first-cycle steady-state discharge voltage of 1.2 V and a cutoff voltage of 0.9 V. The initial discharge was set to 16.7 mAh (20% $DOD_{Zn}$) and all subsequent constant-current charge and discharge steps were limited to a nominal capacity averaging 12.9 mAh (~15% $DOD_{Zn}$) The first cycle was discharged 3.0 mAh more than the subsequent cycles in order to impart a buffering amount of potassium zincate into the electrolyte. For this example, the cell achieved 50 charge-discharge cycles before falling below 80% of the nominal capacity, or a total of 649 mAh, or nearly 8× total theoretical capacity of the Zn electrode, demonstrating successful recharging of both electrodes.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A zinc-air battery comprising:
   a cathode comprising:
      a cathode current collector; and
      a composite comprising:
         a porous carbon material;
         a porous cryptomelane-type MnOx aerogel material;
         a porous $Ni_yFe_{1-y}Ox$ material; and
         a binder;
   an anode comprising:
      a continuous network comprising metallic zinc and having metallic zinc bridges connecting metallic zinc particle cores; and
      a continuous network of void space interpenetrating the zinc network;
   an electrolyte that:
      fills the void space in the anode;
      is in contact with the cathode; and
      permeates the composite without completely filling or obstructing a majority of the pores;
   a separator between the anode and the cathode; and
   a housing that encloses the anode, the cathode, and the separator and that exposes the composite to ambient air.

2. The zinc-air battery of claim 1, wherein the carbon material comprises carbon black.

3. The zinc-air battery of claim 1, wherein the $Ni_yFe_{1-y}Ox$ material comprises $Ni_{0.33}Fe_{0.67}Ox$.

4. The zinc-air battery of claim 1, wherein the $Ni_yFe_{1-y}Ox$ material comprises $Ni_{0.75}Fe_{0.25}Ox$.

5. The zinc-air battery of claim 1, wherein the MnOx material and the $Ni_yFe_{1-y}Ox$ material are made by sol-gel processes.

6. The zinc-air battery of claim 1, wherein the $Ni_yFe_{1-y}Ox$ material is an aerogel.

7. The zinc-air battery of claim 1, wherein the binder is poly(tetrafluoroethylene).

8. The zinc-air battery of claim 1, wherein the electrolyte is aqueous potassium hydroxide.

9. A circuit comprising:
   the zinc-air battery of claim 1; and
   an electrical load electrically attached to the anode and the cathode current collector.

10. A method comprising:
providing the circuit of claim 9;
exposing the composite to an oxygen-containing gas; and
allowing the load to draw a current from the battery by reduction of the oxygen and oxidation of the anode.

11. The method of claim 10, further comprising:
applying a current to the anode and the cathode to recharge the battery.

* * * * *